US012604876B2

(12) United States Patent
Abbott

(10) Patent No.: US 12,604,876 B2
(45) Date of Patent: Apr. 21, 2026

(54) LINE-TO-LEADER QUICK CONNECTION ASSEMBLY AND DEVICE

(71) Applicant: It's Play Time, LLC, Coeur d'Alene, ID (US)

(72) Inventor: Steven Blake Abbott, Coeur d'Alene, ID (US)

(73) Assignee: It's Play Time, LLC, Coeur d'Alene, ID (US)

( * ) Notice: Subject to any disclaimer, the term of this patent is extended or adjusted under 35 U.S.C. 154(b) by 0 days.

(21) Appl. No.: 18/614,501

(22) Filed: Mar. 22, 2024

(65) Prior Publication Data

US 2025/0228226 A1      Jul. 17, 2025

Related U.S. Application Data

(60) Provisional application No. 63/619,733, filed on Jan. 11, 2024.

(51) Int. Cl.
A01K 91/047 (2006.01)

(52) U.S. Cl.
CPC .................................. A01K 91/047 (2013.01)

(58) Field of Classification Search
CPC ...... A01K 91/047; A01K 91/03; A01K 91/04; A01K 91/053; A44B 17/0011; A44C 5/18
USPC ............ 43/44.98, 42.22, 43.1, 44.83, 44.87, 43/44.94; 24/908, 128, 129 R, 130, 24/115 K, 115 N; 403/229
See application file for complete search history.

(56) References Cited

U.S. PATENT DOCUMENTS

| | | | | | |
|---|---|---|---|---|---|
| 85,169 | A | * | 12/1868 | Fisher ..................... | D06F 53/04 256/48 |
| 103,645 | A | * | 5/1870 | Muscroft ............. | A44C 5/2042 114/294 |
| 983,309 | A | * | 2/1911 | Pflueger ................. | A01K 93/00 43/44.94 |
| 1,401,086 | A | * | 12/1921 | King ...................... | A01K 83/00 43/44.83 |
| 1,625,266 | A | * | 4/1927 | Mast ........................ | H01R 4/66 279/93 |
| 2,067,165 | A | * | 1/1937 | Albiser .................. | A01K 93/00 43/44.94 |
| 2,305,234 | A | * | 12/1942 | Bratz ...................... | F16G 11/10 24/581.1 |
| 2,493,431 | A | * | 1/1950 | Wold ..................... | A01K 85/12 D22/129 |
| 2,547,469 | A | * | 4/1951 | Husson ................ | A01K 91/047 43/42.49 |
| 2,552,248 | A | * | 5/1951 | Zavod .................... | A01K 91/04 403/182 |
| 2,599,973 | A | * | 6/1952 | Bujaky ................. | A01K 95/00 43/44.9 |
| 2,748,524 | A | * | 6/1956 | Schinzel ................ | F16G 11/00 43/44.92 |

(Continued)

*Primary Examiner* — Timothy D Collins
*Assistant Examiner* — Maria E Graber
(74) *Attorney, Agent, or Firm* — Ryan Stockett

(57) ABSTRACT

A connector is disclosed for connecting a first fishing line to a second fishing line. The connector may include a body having a first section, a second section, and a mid-section located between the first and second sections. The connector may also include a first securing feature formed in the first section, and a second securing feature formed in the second section. The second securing feature may include a helix protruding away from the mid-section.

13 Claims, 5 Drawing Sheets

(56) References Cited

U.S. PATENT DOCUMENTS

| | | | | | |
|---|---|---|---|---|---|
| 2,804,715 | A | * | 9/1957 | Kimbrough | A01K 95/00 43/44.87 |
| 2,843,967 | A | * | 7/1958 | Kruse | A01K 93/00 43/43.1 |
| 2,869,278 | A | * | 1/1959 | Cook | A01K 97/24 24/503 |
| 3,023,538 | A | * | 3/1962 | Cameron | A01K 93/00 403/206 |
| 3,041,695 | A | * | 7/1962 | Ouellette | A01K 91/04 403/301 |
| 3,120,715 | A | * | 2/1964 | Long | A01K 95/00 43/44.96 |
| 3,172,227 | A | * | 3/1965 | Mackey | A01K 85/18 43/42.31 |
| 3,397,479 | A | * | 8/1968 | Tyjewski | A01K 93/00 43/53.5 |
| 3,857,645 | A | | 12/1974 | Klein | |
| 3,861,814 | A | * | 1/1975 | Fisher | F16G 11/10 403/309 |
| 4,117,574 | A | * | 10/1978 | Yoshida | A01K 91/04 403/291 |
| 4,117,619 | A | * | 10/1978 | Stevenson | A01K 95/00 43/43.1 |
| 4,137,664 | A | * | 2/1979 | Beres | A01K 95/00 43/43.1 |
| 4,177,598 | A | * | 12/1979 | Jolley | A01K 91/04 43/42.49 |
| 4,514,926 | A | * | 5/1985 | Weber, Sr. | A01K 91/04 43/17.2 |
| 4,791,750 | A | * | 12/1988 | Gammill | A01K 85/01 43/42.31 |
| 5,129,175 | A | * | 7/1992 | Pixton | A01K 85/00 43/42.24 |
| 5,152,094 | A | * | 10/1992 | Strickland | A01K 85/00 43/42.39 |
| 5,245,781 | A | * | 9/1993 | Helmuth | A01K 85/00 43/42.19 |
| 5,301,454 | A | * | 4/1994 | Chen | A01K 91/053 24/663 |
| 5,388,368 | A | * | 2/1995 | Lawrence | A01K 91/03 43/44.9 |
| 5,560,140 | A | * | 10/1996 | Nafziger, Jr. | A01K 85/01 43/42.22 |
| 5,809,687 | A | * | 9/1998 | Rosenberg | A01K 91/04 43/44.83 |
| 5,832,655 | A | * | 11/1998 | Crumrine | A01K 85/00 43/42.39 |
| 6,260,241 | B1 | * | 7/2001 | Brennan | F16G 11/00 24/135 R |
| 6,880,289 | B1 | * | 4/2005 | Yin | A01K 91/047 403/353 |
| 6,910,296 | B2 | * | 6/2005 | Blette | A01K 91/047 43/43.1 |
| 6,955,005 | B2 | * | 10/2005 | Storelli | A01K 93/00 43/43.15 |
| 7,475,510 | B2 | * | 1/2009 | Franklin | A01K 95/02 43/44.9 |
| 7,621,069 | B2 | * | 11/2009 | Holtskampf | A01K 91/03 43/44.9 |
| 7,797,877 | B1 | * | 9/2010 | Bennis | A01K 91/03 43/44.87 |
| 7,841,127 | B1 | * | 11/2010 | Nakamichi | A01K 83/06 43/44.8 |
| 8,209,899 | B2 | * | 7/2012 | Klein | A01K 91/047 43/43.1 |
| 8,282,304 | B2 | * | 10/2012 | Uhland | A01K 91/03 43/42.19 |
| 10,106,369 | B2 | * | 10/2018 | Makrinos | H01R 13/72 |
| 10,945,494 | B1 | * | 3/2021 | Thomsen | A44C 5/2076 |
| 11,930,797 | B2 | * | 3/2024 | Ciotola | A01K 85/029 |
| 12,029,207 | B1 | * | 7/2024 | Baird | A01K 91/047 |
| 2003/0233783 | A1 | * | 12/2003 | Storelli | A01K 91/06 43/43.15 |
| 2004/0200126 | A1 | | 10/2004 | Ames | |
| 2005/0022441 | A1 | | 2/2005 | Blette et al. | |
| 2005/0028426 | A1 | * | 2/2005 | Blette | A01K 91/047 43/43.1 |
| 2005/0034356 | A1 | * | 2/2005 | Blette | A01K 91/047 43/44.9 |
| 2005/0039376 | A1 | | 2/2005 | Blette et al. | |
| 2005/0120613 | A1 | * | 6/2005 | Pack | A01K 85/00 43/44.9 |
| 2007/0193106 | A1 | * | 8/2007 | Gregory | A01K 85/00 43/42.39 |
| 2009/0255169 | A1 | * | 10/2009 | Lowitzki | A01K 85/00 43/42.37 |
| 2011/0107651 | A1 | * | 5/2011 | Goodsite | A01K 95/00 43/4.5 |
| 2011/0192071 | A1 | * | 8/2011 | Adelman | A01K 91/08 43/43.1 |
| 2012/0023804 | A1 | * | 2/2012 | Hogan | A01K 85/00 43/44.2 |
| 2013/0091756 | A1 | | 4/2013 | Stahl | |
| 2015/0128473 | A1 | * | 5/2015 | Kim | A01K 83/06 43/43.13 |
| 2016/0165868 | A1 | * | 6/2016 | LeHew | A01K 85/00 43/42.74 |
| 2016/0270379 | A1 | * | 9/2016 | Perez | A01K 85/00 |
| 2018/0146654 | A1 | | 5/2018 | Wakefield | |
| 2022/0151209 | A1 | * | 5/2022 | Branum | A01K 85/00 |
| 2022/0264856 | A1 | * | 8/2022 | Malooley | A01K 83/06 |
| 2025/0031682 | A1 | * | 1/2025 | Camargo | A01K 91/04 |

* cited by examiner

LINE-TO-LEADER QUICK CONNECTION ASSEMBLY AND DEVICE

RELATED APPLICATIONS

This application is based on and claims the benefit of priority from U.S. Provisional Application No. 63/619,733 that was filed on Jan. 11, 2024, the contents of which are expressly incorporated herein by reference.

TECHNICAL FIELD

The present disclosure relates generally to a connection assembly and device and, more particularly, to a device and assembly usable to quickly connect a leader to a main fishing line.

BACKGROUND

Fishing is a popular sport enjoyed by many around the world. Several different methods of fishing are common, including bait-casting, spin-casting, and fly-casting. In each method of fishing, one or more hooks are fastened to the end of a line. In bait-casting, real or artificial bait is impaled on or otherwise connected to the hook as an attractant for the fish to bite the hook. In spin-casting, a spinner bait or lure is connected to the hook and designed to imitate a swimming action as the line is reeled in. In fly-casting, an artificial fly is formed around the hook and can be presented to the fish on top of the water using floating line or under the water using sinking line.

In some instances, a leader is connected between the main fishing line and the hook. The leader is generally made from a different material than the main fishing line and provides a benefit over using only the main fishing line. For example, the leader may be a different color, a different weight, a different diameter, etc. that reduces its visibility to the fish in the water. The leader may also perform differently (e.g., float higher, sink slower, stretch more, kink less, resist greater abrasion, etc.) than the main line.

Regardless of the method of fishing used and whether a leader is deployed, it can be beneficial to periodically swap out the hook, bait, lure or fly for a hook and/or attractant having a different type, size, shape, weight, buoyancy, color, etc. Depending on how the attractant is connected to the line or leader, a significant amount of time can be wasted by swapping. For example, if the attractant is tied directly to the line or leader, each swap may require the line to be cut and a new knot to be tied. Not only is this time consuming, but it can also be difficult to do in situ. This may be particularly true for children, the elderly, and/or those that are vision and/or fine-motor impaired.

An improved method for swapping out leaders, hooks, and/or attractants includes the use of a quick or snap-type connector that removably connects a leader to a main line and/or a hook to a leader. An example of such a device is disclosed in U.S. Pat. No. 10,945,494 that issued to Thomsen on Mar. 16, 2021 (the '494 patent). The '494 patent discloses a clasp including a plastic or metallic primary body and a plastic or metallic secondary body. Each of the primary and secondary bodies have an outer end equipped with an eyelet for connection to either a main fishing line or to a leader. The primary body has a blind bore formed within an inner end, while the secondary body has a rod protruding from an inner end. The bore in the primary body receives the rod of the secondary body. A leg protrudes transversely from a distal end of the rod to engage a locking channel that spirals around a side wall of the bore. When the primary body is connected to the secondary body through relative twisting, the leader is joined to the main fishing line in a removable manner. Another substantially identical secondary body connected to a different leader can be easily swapped with the original secondary body and connected to the original primary body, thereby connecting the different leader to the main line. In this manner, any number of leaders equipped with any variety of hooks and attractants can be quickly and easily connected to the main line.

While the clasp of the '494 patent may improve an amount of time and effort required to swap out leaders, hooks, and/or attractants, the clasp may be complex, heavy, delicate, difficult to fabricate, expensive, and/or complicated to use. This may be particularly true for children, the elderly, and those with vision or fine-motor impairment. In addition, the clasp may have a singular performance profile that can limit application to different fishing conditions.

The disclosed connection assembly and devices are directed at addressing one or more of these issues discussed above and/or other problems of the prior art.

SUMMARY

In one aspect, the present disclosure is directed to a connector for connecting a first fishing line to a second fishing line. The connector may include a body having a first section, a second section, and a mid-section located between the first and second sections. The connector may also include a first securing feature formed in the first section, and a second securing feature formed in the second section. The second securing feature may include a helix protruding away from the mid-section.

In another aspect, the present disclosure is directed to another connector for connecting a first fishing line to a second fishing line. This connector may include a body having a first section, a second section, and a mid-section located between the first and second sections. The connector may also include a first securing feature formed in the first section, and a second securing feature formed in the second section. The connector may further include a hole formed in the mid-section to receive a plug that changes a buoyancy characteristic of the connector.

In yet another embodiment, the present disclosure is directed to a connection assembly for connecting a leader to a primary fishing line. The connection assembly may include a body having a line section, a leader section located, and a mid-section located between the line and leader sections. The connection assembly may also include an eyelet formed in the line section, and a helix formed in the leader section and protruding away from the mid-section. The connection assembly may further include a ring attachable to the helix to retain a leader attached to the leader section.

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1% of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
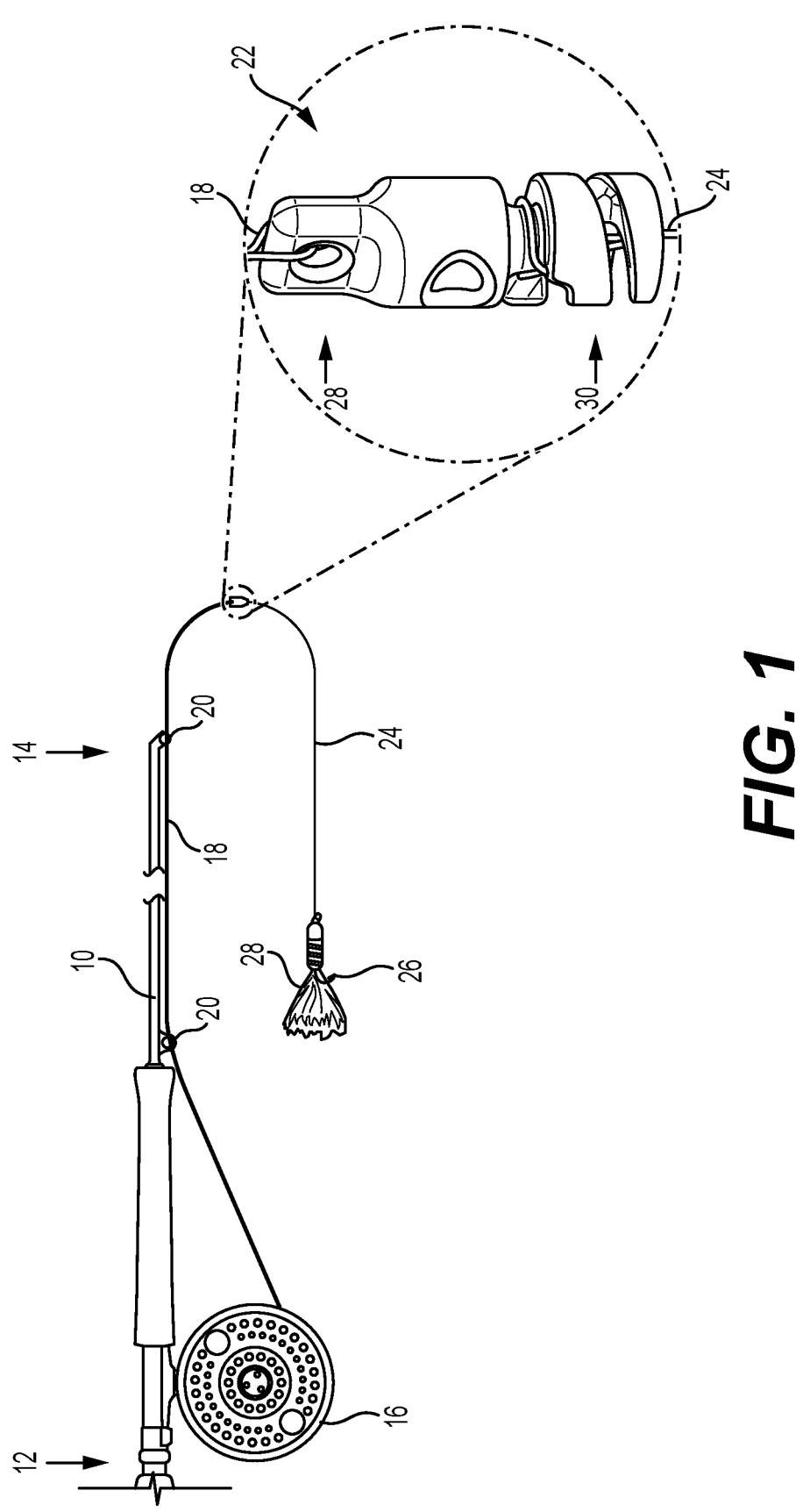
FIG. 1 is a diagrammatic illustration of an exemplary disclosed fishing setup.

FIG. 1 illustrates common fishing equipment that is set up for efficient swapping of hooks and/or attractants. This equipment may include, among other things, a rod 10 having a base end 12 and a tip end 14, a reel 16 removably connected to base end 12, and a line 18 spooled within and/or around reel 16. A loose external end of line 18 may pass through eyelets 20 that are spaced along a length of rod 10 and terminate at a connector 22. A leader 24 is shown in FIG. 1 as having a first end temporarily and removably attached to connector 22, and a second end attached to a hook 26. In some applications, an attractant (e.g., bait, lure, fly, etc.) 28 may be associated with hook 26. It should be noted that, while some of the equipment depicted in FIG. 1 (e.g., rod 10 and reel 16) may be recognizable as associated with a particular method of fishing (e.g., fly-casing), this disclosure may apply equally to other methods of fishing (e.g., to bait-casting, spin-casting, etc.).

In one embodiment, line 18 and leader 24 have different characteristics. For example, line 18 and leader 24 may differ in strength, toughness, buoyancy, color, transparency, diameter, material, length, etc. In general, line 18 may be longer and stronger than leader 24, and leader 24 may be more transparent and/or tougher. However, it is contemplated that line 18 and leader 24 could be substantially identical or have different relative characteristics, as desired. The loose end of line 18 (i.e., the end not associated with reel 16) may generally be permanently attached to connector 22 (e.g., via a tied knot or other mechanism that may require severing of line 18 for detachment), while the first end of leader 24 may be removably attached to connector 22 (i.e., such that severing of leader 24 is not required for detachment). Any knot (e.g., a Palomar knot, an improved clinch knot, a loop knot, a swivel knot, etc.) desired by the user may be used to permanently attach line 18 to connector 22.

As shown in the enlarged portion of FIG. 1, connector 22 may include a line end 28 and a leader end 30 that is different than and located opposite line end 28. Line 18 may connect to line end 28, while leader 24 may connect to leader end 30. It is contemplated, however, that connector 22 could be used in reverse configuration, if desired. It is also contemplated that connector 22 could have substantially identical ends (e.g., two line ends 28 or two or more leader ends 30—see right side of FIG. 4), if desired.

Figure 3:
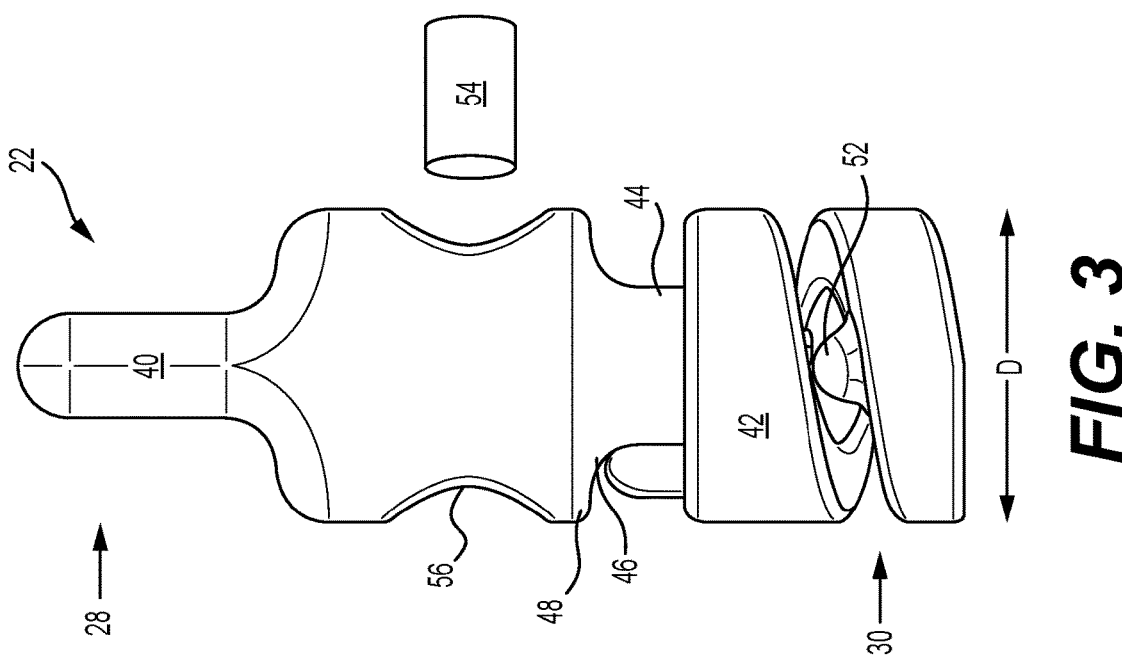
FIGS. 2 and 3 are diagrammatic illustrations of a connection assembly that may form a portion of the fishing setup of FIG. 1.
Figure 2:
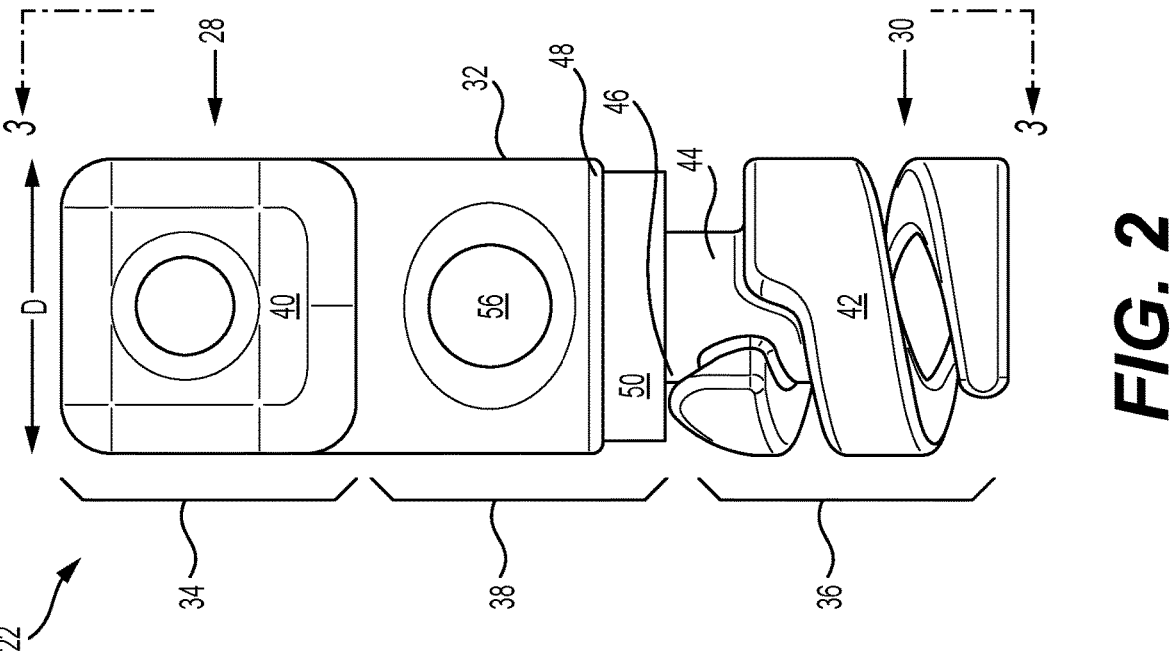

As shown in FIGS. 2 and 3, connector 22 may include a generally cylindrical, monolithic body 32 that extends from line end 28 to leader end 30. Body 32 may generally be divided into three sections, including a line section 34 located at line end 28, a leader section 36 located at leader end 30, and mid-section 38 located between line and leader sections 34, 36. A maximum diameter D of body 32 may be generally consistent throughout the sections of body 32.

In the disclosed embodiment, an axial length of each of sections 34-38 may be about the same (e.g., about ⅓ of an overall length of connector 22). It should be noted, however, that this length relationship may not be true in all embodiments. For example, depending on a strength rating and/or intended fishing method of connector 22, one or more of sections 34-38 may be longer than another section, if desired.

Line section 34 may have a securing feature (e.g., a ring, eyelet, etc.) 40 formed therein at line end 28. Eyelet 40 may have an outer diameter extending in a first direction that is substantially identical to the diameter D of body 32 (see FIG. 2), but a thickness in a second direction orthogonal to the first direction that is less than the diameter D (see FIG. 3). The thickness of eyelet 40 may be generally centered about a center axis of connector 22. A center hole may be formed through eyelet 40 of line section 34 and have an axis generally aligned with the thickness direction of eyelet 40. A generally solid perimeter of material may surround the through hole. With this configuration, the loose end of line 18 may pass through the hole and wrap around a portion of the solid perimeter to extend back towards itself for knotting. Eyelet 40 may allow line 18 to be permanently connected to connector 22. Edges (e.g., inner and outer edges) of eyelet 40 may be rounded to inhibit snagging of line 18 during use.

Leader section 36, like line section 34, may also have a securing feature 42 formed therein. However, securing feature 42 may be different than securing feature 40. For example, securing feature 42 may be formed to quickly secure a loop of leader 24 in such a manner that the loop can be readily (e.g., without severing of leader 24) replaced with the loop of a different leader 24.

In the example of FIGS. 2 and 3, securing feature 42 embodies a helical protrusion extending in an axial direction away from mid-section 38. Feature 42 may include a first portion that is proximal mid-section 38 and a second distal portion. The proximal portion may resemble a male thread formed around an exterior of a rod 44 that is axially aligned with and protrudes from mid-section 38. Rod 44 may have a diameter smaller than the diameter D, but an outer diameter of the male thread may have a diameter substantially identical to the diameter D. Rod 44 may extend less than a full axial length of securing feature 42, such that the distal portion of feature 42 forms a true helix (i.e., such that the male threads are formed around a hollow center at leader end 30).

A cross-section of the helix (e.g., of a single thread in the helix) may be rectangular, elliptical, circular, triangular, or other geometrical shape. In one embodiment, the cross-section of the helix tapers from a larger area at the proximal end to a smaller area at the distal end. In the disclosed embodiment, the helix of feature 42 spirals through about 360° and to an axial length that is about twice the axial length of rod 40. It is contemplated, however, that the helix may spiral through at least 180°, with a greater spiral resulting in greater retention of leader 24. It should be noted, however, that excessive spiraling can be cumbersome when swapping out equipment and result in wasted material.

A gap 46 may be maintained between a base end of the helix's male thread and a shoulder 48 that is formed at a lower end of mid-section 38. As will be explained in greater detail below, gap 46 may allow for the loop of leader 24 to slide in a complete circle around rod 44 at shoulder 48 (e.g., in an attaching rotational direction). Gap 46 may also expose the base end of the male thread, allowing the base end to function as a stop against counterrotation in an opposing detaching direction. In some embodiments, an outer radial edge of the male thread at gap 46 may be located axially closer to mid-section 38 (i.e., the outer edge may be taller), compared to an inner radial edge (i.e., the gap may be less at the outer radial edge). This rise at the outer radial edge may reduce a likelihood of the leader loop unintentionally becoming dislodged from connector 22.

In the embodiment disclosed in FIG. 2, a ring 50 (e.g., a flexible or compliant ring, such as an o-ring) is shown as having been threaded over the helix of feature 42 to substantially fill gap 46 (connector 22 shown without ring 50 in FIG. 3). Ring 50, once installed against shoulder 48, may inhibit removal of the leader loop from connector 22.

In some embodiments, properties of ring 50 may be selected to vary desired flotation characteristics of connector 22. For example, a first ring 50 selected for use with connector 22 may have a specific gravity greater than 1 (e.g., a density greater than water-allowing connector 22 to sink at desired rate and/or to a desired depth), while a second ring 50 selected for use with connector 22 may have a specific gravity less than 1 (e.g., allowing connector 22 to float).

FIG. 3 illustrates an additional or alternative feature that functions in a manner similar to ring 50, to inhibit unintentional detachment of the leader loop from connector 22. In this embodiment, a removal stop 52 may be formed between overlapping spirals of feature 42 and extend from a spiral surface located closest to leader end 30 in a direction toward line end 28. Stop 52 may extend a majority (e.g., 75%, 85%, 95% or more) of an axial distance between the spirals. In one example, a gap less than a diameter of leader 24 may remain between stop 52 and an adjacent surface of the mating spiral, thereby inhibiting passage of leader line 24 through the gap. In this embodiment, the spirals of feature 42 may be sufficiently flexible or compliant in the axial direction of connector 22 to allow the leader loop to temporarily expand and be pulled through the gap.

In some applications, the use of ring 50 to adjust buoyancy characteristics of connector 22 may be undesired and/or insufficient. In these applications, a plug 54 having a desired specific gravity may be optionally utilized. For example, a through or blind hole 56 may be formed within mid-section 36, and plug 54 may be selectively pushed into hole 56 to thereby alter the buoyancy of connector 22. A first plug 54 may likewise easily be pushed out of hole 56 and replaced with a second plug 54 having differing characteristics.

It is contemplated that ring 50, plug 54, and/or hole 56 may also or alternatively be utilized as a strike indicator, if desired. For example, ring 50 and/or plug 54 may be brightly colored, such that connector 22 can be seen from a distance. In this example, when ring 50 or plug 54 is no longer visible (e.g., pulled under the water surface), it can be assumed that a fish has taken hook 26. Similarly, rather than plug 54 being passed into hole 56, another highly visible material (e.g., yarn, flag, etc.) may be placed into hole 56.

Connector 22 may be fabricated from any material in any number of different ways. In the disclosed embodiment, connector 22 is fabricated from plastic (e.g., UV-resistant plastic, neoprene, etc.) via a 3D printing, injection molding, and/or over-molding process. Injection molding may be used to create a greater number of connectors 22 at a time, in a faster and more efficient manner.

Figure 4:
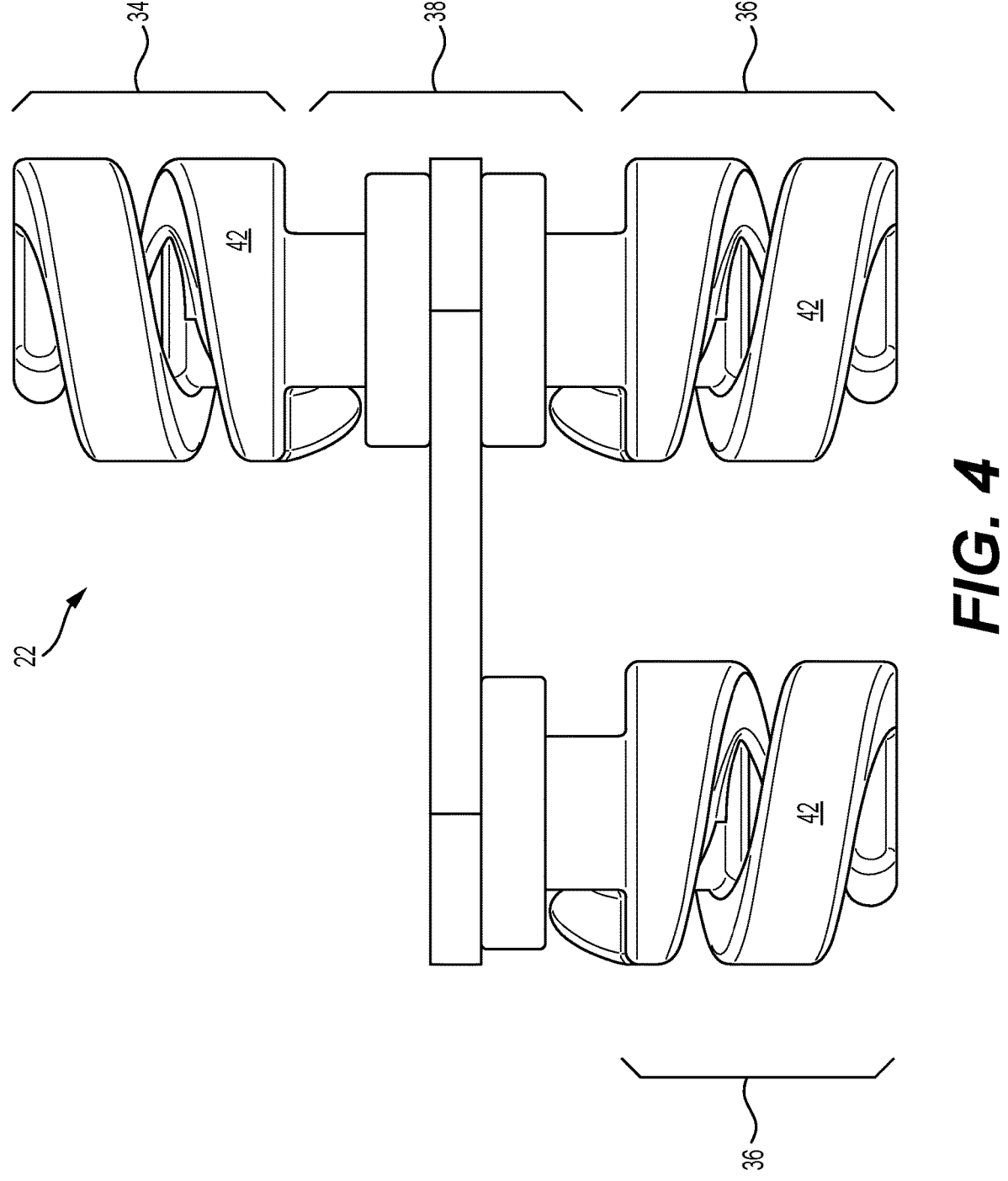
FIGS. 4 and 5 are diagrammatic illustrations of exemplary disclosed connectors that may form a portion of the connection assembly of FIGS. 2 and 3.

FIG. 4 illustrates another embodiment of connector 22. In this embodiment, both line section 34 and lead section 36 include attachment feature 42 having the helical protrusion. With this configuration, both line 18 and leader 24 may be removably attached to connector 22, such that either or both of line 18 and leader 24 could be removed without severing. In addition, connector 22 of FIG. 4 includes a second leader section 36 such that two leaders 24 may be simultaneously connected to a single line 18. In this configuration, mid-section 38 may extend transversely between and be integral with the two leader sections 36. It is contemplated that more than two leader sections 36 could be connected to a single line section 34, if desired.

Figure 5:
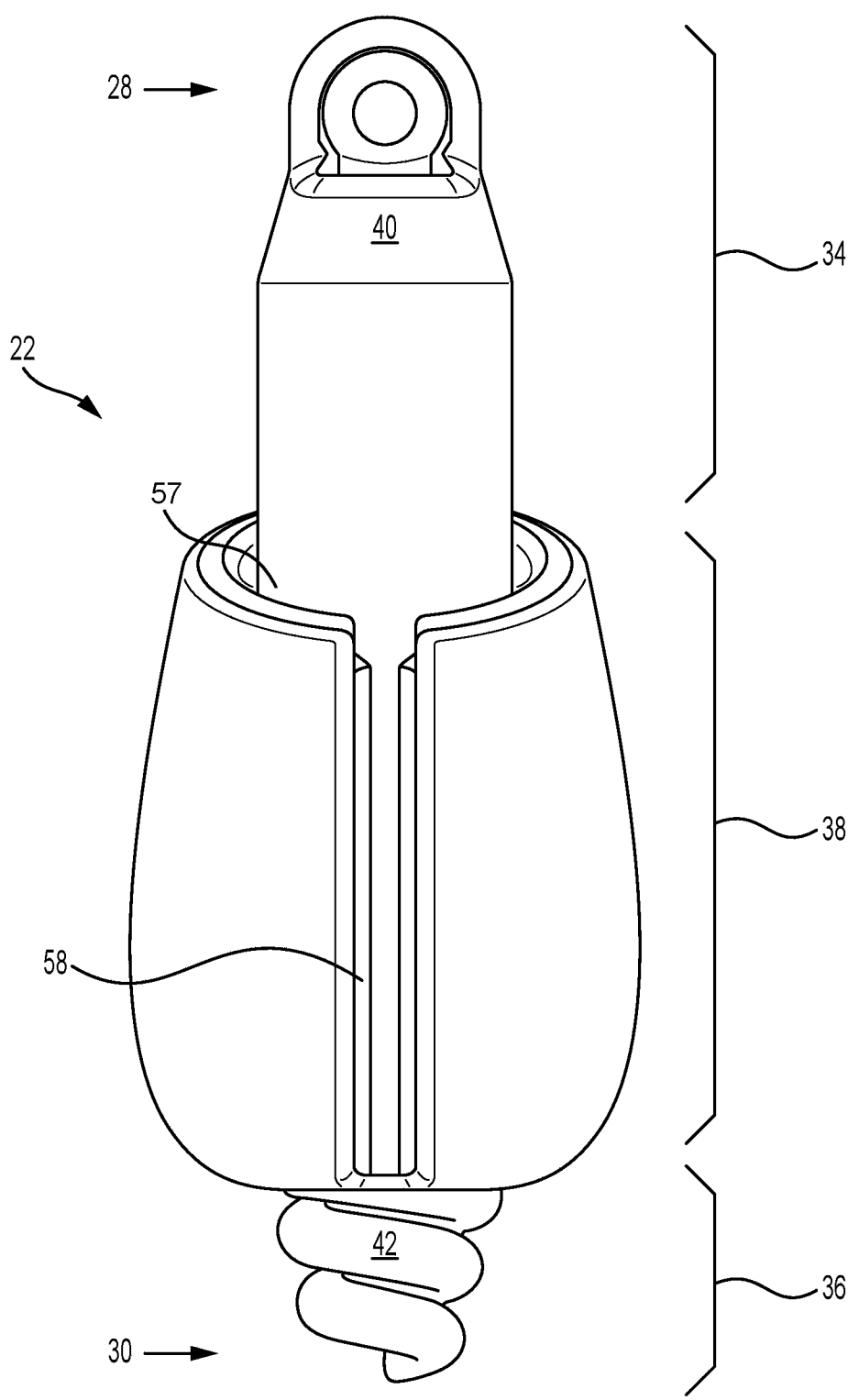

FIG. 5 illustrates another embodiment of connector 22. Connector 22, like the other connectors, may also have a line section 34 with attachment feature 40, a leader section 36 with attachment feature 42, and a mid-section 38 extending between line and leader sections 34, 36. However, leader section 36 in this embodiment may omit rod 40, and mid-section 38 may be larger (e.g., axially longer and/or thicker) than the other sections and bulbous. In this configuration, mid-section 38 may function as a strike indicator and/or a float for bait casting. The leader loop may be opened and passed over leader end 30, axially upwards towards line end 28. The loop may then be recessed into a collar 57 located at the interface between line section 34 and mid-section 38, with the trailing leader 24 being pressed into an axial groove 58 formed in an outer annular surface of mid-section 38. The portion of leader 24 extending out of groove 58 towards leader end 30 may then be wrapped into the helical spirals of feature 42, such that leader 24 becomes locked in place. In some embodiments, ring 50 (shown only in FIG. 3) may be placed inside collar 57 to ensure that the leader loop stays fixed in place.

Figure 6:
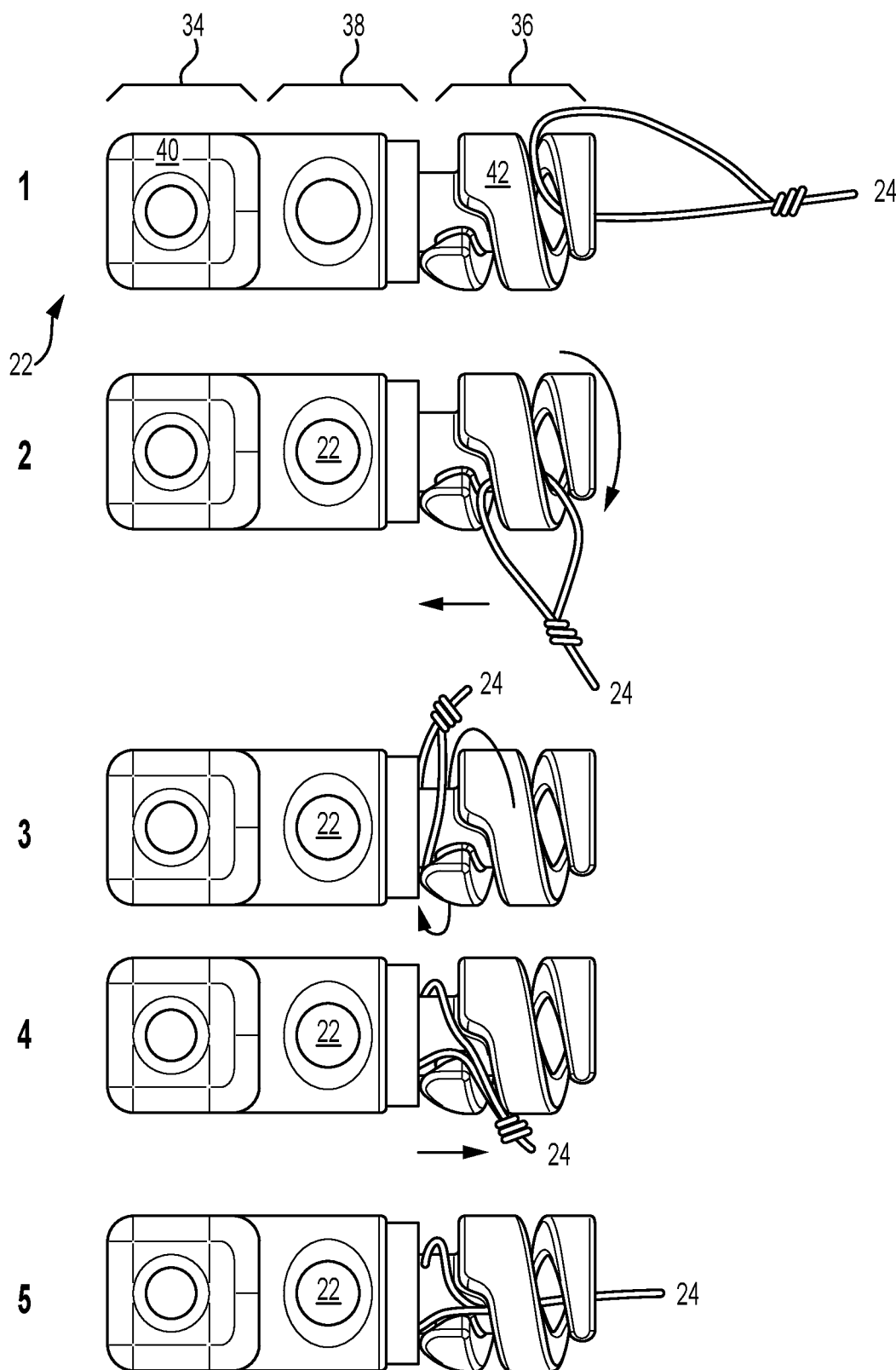
FIG. 6 is chart depicting attachment steps associated with the connectors and assemblies of FIGS. 2-5.

FIG. 6 illustrates an example process for removably attaching a loop in leader 24 to connector 22. FIG. 6 will be discussed in the following section to further illustrate the disclosed concepts.

INDUSTRIAL APPLICABILITY

The disclosed connectors 22 and connection assemblies (e.g., connector 22, ring 50, plug 54, etc.) may be used to efficiently connect any number of different leaders 24, hooks 26, and/or attractants 28 to line 18. In addition, the disclosed connectors 22 and connections assemblies may facilitate quick, simple, and efficient swapping of leaders, 24, hooks, 26, and/or attractants 28. An example process for removably attaching a leader 24 to connector 22 will now be described in detail with reference to FIG. 6.

To connect leader 24 to connector 22, line section 34 may be held with the non-dominant hand, such that leader section 42 is exposed and extends away from the hand. A loop previously tied in the loose end (i.e., the end opposite hook 26) of leader 24 may be held in the dominant hand, with the loop extending away from the hand toward connector 22. One strand of the loop may be placed over a distal tip of the helix (i.e., such that the loop encircles the spiral), as shown in Step-1 of FIG. 6.

The dominant hand (together with the loop of leader 24) may then be rotated in a first direction (e.g., in a clockwise direction, when viewed from the right in FIG. 6) about the central axis of connector 22, such that the loop passes around the helix and simultaneously advances towards mid-section 38 (e.g., advances leftward in FIG. 6—see Step-2). This rotation may continue through about 360° (see Step-3) or until the loop completely encircles the base end of rod 40.

Once the loop of leader 24 completely encircles rod 40 at the base end, the dominant hand may then be translated rightward and simultaneously counterrotated, such that both strands of the loop pass back between the gap between adjacent spirals (see Step-4). In this embodiment, one strand of the loop will rest against the base end of the male thread.

The dominant hand may continue the counterrotation until the leader passes into the hollow center of the helix (see Step-5).

Many advantages over the prior art are provided by the disclosed connectors 22 and connection assemblies. For example, because connectors 22 are formed as monolithic components, connectors 22 are simple and inexpensive to fabricate. The ability to injection mold connectors 22 from plastic may also help to reduce fabrication difficulty and cost. The lack of moving parts may make connection and usage simple and quick, even for children, the elderly, and the vision and/or fine motor impaired. Further, the ability to adjust buoyancy characteristics of connectors 22 make connectors 22 more applicable to different methods of fishing and environmental conditions.

It will be apparent to those skilled in the art that various modifications and variations can be made to the disclosed assemblies and connectors. Other embodiments will be apparent to those skilled in the art from consideration of the specification and practice of the disclosed assemblies and connectors. It is intended that the specification and examples be considered as exemplary only, with a true scope being indicated by the following claims and their equivalents.

What is claimed is:

1. A connector for connecting a leader to a primary fishing line, comprising:
   a body having a first section configured to connect to the primary fishing line, a second section configured to connect to the leader, and a mid-section located between the first and second sections;
   a first securing feature formed in the first section; and
   a second securing feature formed in the second section, the second securing feature including:
     a helix protruding away from the mid-section; and
     a removal stop integrally formed with and located between spirals of the helix.

2. The connector of claim 1, further including a rod extending from the mid-section only partway through a hollow center of the helix.

3. The connector of claim 1, wherein the first securing feature is substantially identical to the second securing feature.

4. The connector of claim 1, wherein the first securing feature includes an eyelet.

5. The connector of claim 1, wherein:
   the body includes a third section substantially identical to the second section; and
   the mid-section connects both the second and third sections to the first section.

6. The connector of claim 1, wherein:
   the removal stop reduces a gap between the spirals to a distance less than a diameter of the leader; and
   the spirals are configured to flex during attachment of the leader to increase the distance and allow the leader to pass through the gap.

7. The connector of claim 1, wherein the mid-section includes a hole configured to receive a plug that changes a buoyancy characteristic of the connector.

8. The connector of claim 1, wherein the helix rotates through about 360°, from a distal tip to a base end adjacent the mid-section.

9. The connector of claim 1, wherein the body is generally cylindrical.

10. The connector of claim 1, wherein:
    the mid-section has a greater axial length than the first and second sections; and
    the mid-section is bulbous.

11. The connector of claim 10, wherein the body further includes:
    a collar formed at an interface between the first section and the mid-section; and
    an axial groove formed in an outer annular surface of the mid-section.

12. A connector for connecting a leader to a primary fishing line, comprising:
    a body having a first section configured to connect to the primary fishing line, a second section configured to connect to the leader, and a mid-section located between the first and second sections;
    a first securing feature formed in the first section; and
    a second securing feature formed in the second section, the second securing feature including:
    a helix protruding away from the mid-section, wherein:
    the helix includes a male thread spaced apart from the mid-section at a base end to form a gap; and
    an end of the male thread terminates at the gap to function as an end stop for the leader.

13. The connector of claim 9, wherein a maximum outer diameter of each of the first, second, and mid-sections is about equal.

*   *   *   *   *